(12) United States Patent
Kim

(10) Patent No.: US 8,044,551 B2
(45) Date of Patent: Oct. 25, 2011

(54) STATOR FOR ELECTRIC MOTOR AND MANUFACTURING METHOD THEREOF

(75) Inventor: Sang-Young Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 12/441,641

(22) PCT Filed: Sep. 19, 2007

(86) PCT No.: PCT/KR2007/004564
§ 371 (c)(1),
(2), (4) Date: Mar. 17, 2009

(87) PCT Pub. No.: WO2008/035920
PCT Pub. Date: Mar. 27, 2008

(65) Prior Publication Data
US 2009/0267443 A1     Oct. 29, 2009

(30) Foreign Application Priority Data
Sep. 21, 2006  (KR) .................. 10-2006-0091995

(51) Int. Cl.
*H02K 1/06* (2006.01)
(52) U.S. Cl. .................. 310/216.109; 310/214
(58) Field of Classification Search .......... 310/216.089, 310/216.109, 214, 215
See application file for complete search history.

(56) References Cited

U.S. PATENT DOCUMENTS

| 6,121,711 A * | 9/2000 | Nakahara et al. .......... 310/254.1 |
| 6,555,942 B1 * | 4/2003 | Hsu .............................. 310/208 |
| 6,870,292 B2 * | 3/2005 | Owada et al. ................. 310/194 |
| 7,489,061 B2 * | 2/2009 | Nishimura .................... 310/215 |
| 2009/0072647 A1 * | 3/2009 | Hino et al. ............... 310/156.15 |

FOREIGN PATENT DOCUMENTS

| KR | 10-0158474 | 8/1998 |
| KR | 10-2005-0048962 | 5/2005 |
| KR | 10-2005-0107644 | 11/2005 |

OTHER PUBLICATIONS

International Search Report dated Jan. 15, 2008.

* cited by examiner

*Primary Examiner* — Nguyen N Hanh
(74) *Attorney, Agent, or Firm* — KED & Associates, LLP (57) ABSTRACT

A stator for an electric motor is provided. The stator includes segmented cores each having one yoke and at least one pole protruding from the yoke in a radial direction, bobbins formed to receive the at least one pole therein, having blocking walls that extend from one side of ends of the at least one pole in a circumferential direction thereby to block a space between the at least one pole, and coupled to the at least one pole, and stator coils wound on the bobbins. A temperature of the segmented cores and the stator coils are prevented from rising and a noise occurrence is reduced.

16 Claims, 9 Drawing Sheets

STATOR FOR ELECTRIC MOTOR AND MANUFACTURING METHOD THEREOF

TECHNICAL FIELD

The present invention relates to a stator for an electric motor and a manufacturing method thereof, and more particularly, to a stator for an electric motor capable of preventing a temperature rise thereof when a rotor is rotated and capable of reducing noise, and a manufacturing method thereof.

BACKGROUND ART

Figure 1:
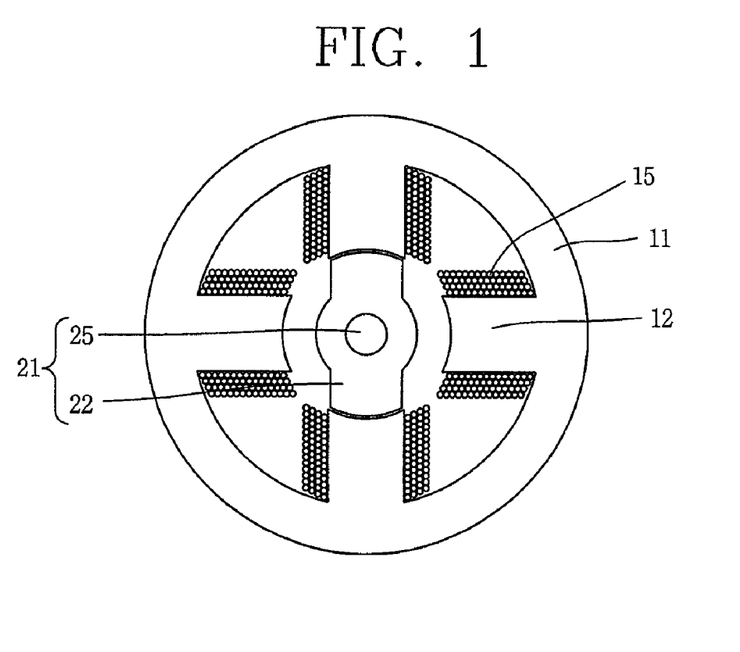
FIG. 1 is a planar section view showing a motor in accordance with the conventional art.
Figure 2:
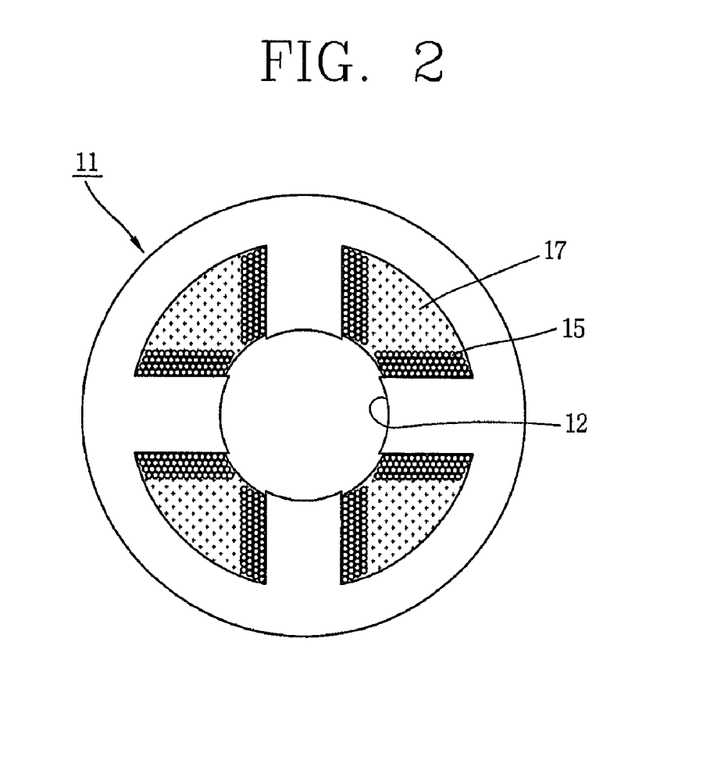
FIGS. 2 and 3 are views respectively showing a stator and a rotor in accordance with the conventional art.
Figure 3:
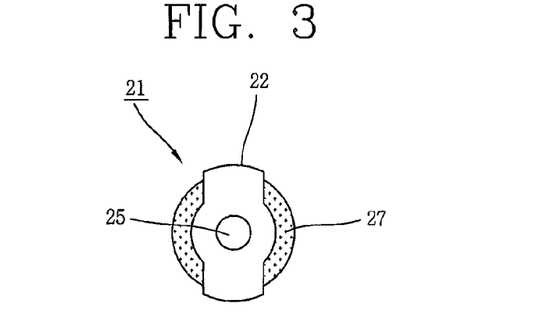

FIG. 1 is a planar section showing a motor in accordance with the conventional art, and FIGS. 2 and 3 are views respectively showing a stator and a rotor in accordance with the conventional art. As shown in FIG. 1, the conventional motor comprises a stator 11 that is fixedly installed, and a rotor 21 disposed to be rotatable with respect to the stator 11. The rotor 21 is provided with a pole 22 protruding in a radius direction. The stator 11 is formed by laminating a plurality of steel plates, each steel plate having a plurality of the poles 22 therein. A stator coil 15 for forming a magnetic field is wound on each pole 12 of the stator 11.

When the rotor 21 is rotated as power is applied to the stator coil 15, the pole 12 of the stator 11 and a pole 22 of the rotor 21 come closer to each other. Here, noise occurs by a blade passage frequency (BPF).

Since the rotor 21 is rotated with a high rpm corresponding to 30~80 thousands, noise may severely occur even by a small factor to generate noise.

In order to solve the problem, as shown in FIG. 2, a space between the poles 12 of the stator 11 was filled by a molding material 17 formed of a synthetic resin member, etc. Also, as shown in FIG. 3, a molding material 27 formed of a synthetic resin member was formed between the poles 22 of the rotor 21 thereby to reduce noise.

However, when the molding materials 17 and 27 are formed in the conventional switched reluctance motor, a passage of air that flows along an axial line of the rotor 21 thus to cool the stator 11 and the rotor 21 is decreased in size or blocked. Accordingly, the temperature of the stator 11 and the rotor 21 is risen, thereby to cause a forcible deterioration of components and a function lowering of the motor.

DISCLOSURE OF THE INVENTION

Therefore, it is an object of the present invention to provide a stator for an electric motor capable of preventing a temperature rise thereof and capable of reducing noise, and a manufacturing method thereof.

It is another object of the present invention to provide a stator for an electric motor capable of facilitating a winding operation of a coil, and a manufacturing method thereof.

To achieve these objects, there is provided a stator for an electric motor, comprising: a plurality of segmented cores each having one yoke and at least one pole protruding from the yoke in a radial direction; a plurality of bobbins formed to receive the poles therein, having blocking walls extending from one side of ends of the poles in a circumferential direction thereby to block a space between the poles, and coupled to the poles; and stator coils wound on the bobbins.

Preferably, the blocking wall is formed so that an interval between the poles adjacent to each other can be blocked by 0.85 or more than.

Preferably, the blocking wall may be configured to have a cylindrical shape as both sides of one blocking wall come in contact with sides of adjacent blocking walls.

The bobbin may include a yoke receiving portion for receiving the yoke, and a pole receiving portion for receiving the pole.

The segmented core may have one pole, and the bobbin may be formed to correspond to each of the segmented cores.

The segmented core may have one pole, and the bobbin may be formed to correspond to each of the segmented cores.

The segmented core may have a plurality of poles, and the bobbin may have one pole receiving portion.

An engaging portion for preventing the yoke from being separated from the yoke receiving portion may be formed at the yoke receiving portion in a circumferential direction.

A through hole for exposing an end of the pole outwardly may be formed at the bobbin so that the end of the pole can be disposed on the same circumference as an outer surface or an inner surface of the blocking wall.

To achieve these objects, there is also provided a method for manufacturing a stator for an electric motor, comprising: respectively forming a plurality of segmented cores and a plurality of bobbins, each of the segmented cores having one yoke and at least one pole protruding from the yoke in a radial direction, the bobbins having blocking walls and coupled to the poles, the blocking walls extending from ends of the poles in a circumferential direction and coupled to each other thereby to block a space between the poles; winding stator coils on the bobbins; and coupling the segmented cores and the bobbins to each other.

The method may further comprise coupling the segmented cores to each other in a circumferential direction after the coupling between the segmented cores and the bobbins.

According to another aspect of the present invention, the stator for an electric motor comprises: a stator core having one yoke and a plurality of poles protruding from the yoke in a radial direction; a plurality of bobbins formed to receive the poles therein, having at least one blocking wall extending from one side of ends of the poles in a circumferential direction thereby to block a space between the poles, and coupled to the poles; and stator coils wound on the bobbins.

The blocking wall may be formed so that an interval between the poles adjacent to each other can be blocked by 0.85 or more than.

The blocking wall may be configured to have a cylindrical shape as both sides of one blocking wall come in contact with sides of adjacent blocking walls.

The bobbin may include a yoke receiving portion for receiving the yoke, and a pole receiving portion for receiving the pole.

According to another aspect of the present invention, the method for manufacturing a stator for an electric motor comprises: respectively forming a stator core and a plurality of bobbins, the stator core having one yoke and a plurality of poles protruding from the yoke in a radial direction, the bobbins formed to receive the poles therein, having at least one blocking wall extending from one side of ends of the poles in a circumferential direction thereby to block a space between the poles, and coupled to the poles; and winding stator coils on the bobbins; and coupling the bobbins having the stator coils wound thereon to each pole of the stator core.

According to still another aspect of the present invention, the stator for an electric motor comprises: a stator core having one yoke and a plurality of poles protruding from the yoke in a radial direction; a plurality of bobbins formed to receive the poles therein, having blocking walls coupled to each other in a thickness direction of the stator core thereby to receive the stator core therein, the blocking walls extending from ends of the poles in a circumferential direction thereby to form a rotor receiving space therein; and stator coils wound on the bobbins.

The bobbin may include a yoke receiving portion for receiving the yoke, and a pole receiving portion for receiving the pole.

According to still another aspect of the present invention, the method for manufacturing a stator for an electric motor comprises: respectively forming a stator core and a plurality of bobbins, the stator core having one yoke and a plurality of poles protruding from the yoke in a radial direction, the bobbins having blocking walls coupled to each other in a thickness direction of the stator core thereby to receive the stator core therein, the blocking walls extending from ends of the poles in a circumferential direction thereby to form a rotor receiving space therein; coupling the bobbins to the stator core; and winding the stator coils on the bobbins.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Hereinafter, a stator for an electric motor according to the present invention will be explained in more detail.

Figure 4:
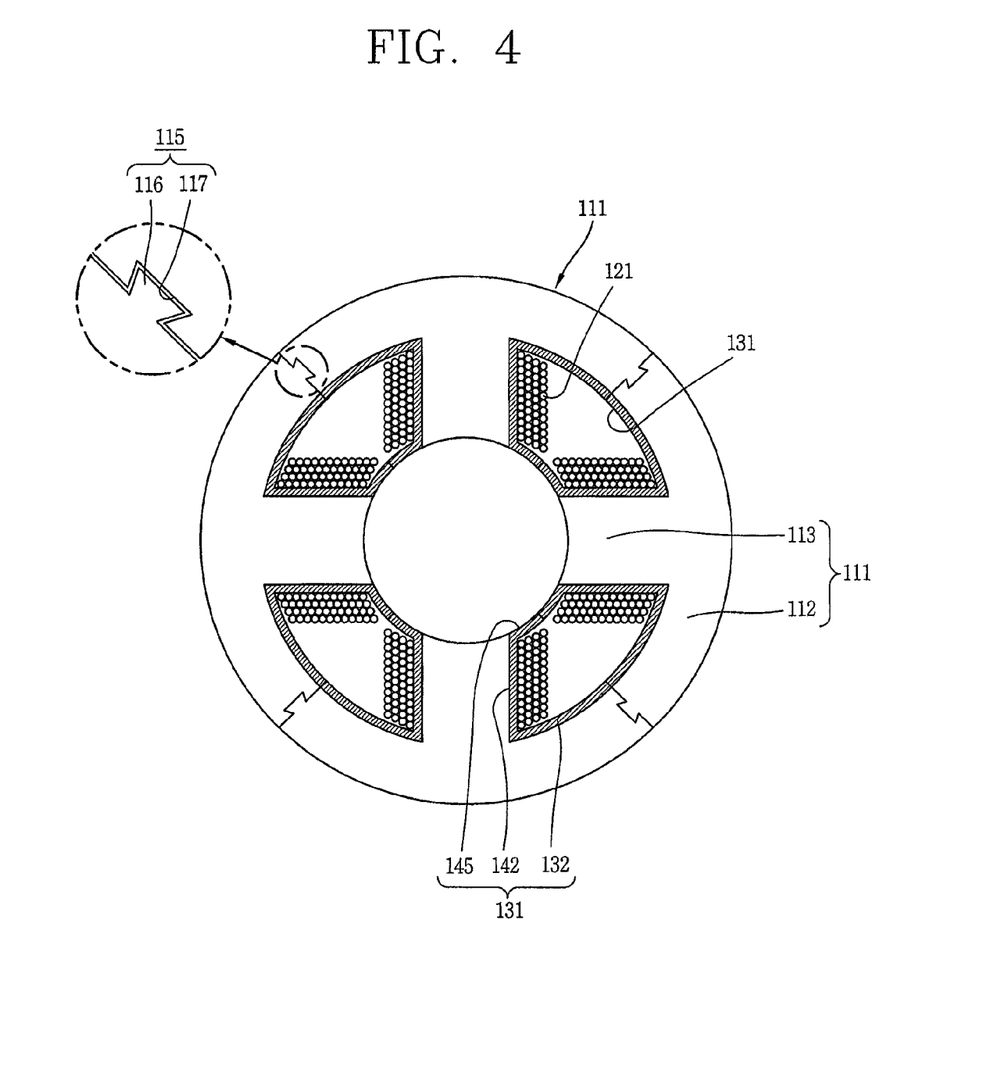
FIG. 4 is a planar section view showing a stator of a motor according to a first embodiment of the present invention.

As shown in FIG. 4, the stator for an electric motor according to the present invention comprises: a plurality of segmented cores 111 each having one yoke 112 and one pole 113 protruding from the yoke 112 in a radial direction; a plurality of bobbins 131 having blocking walls 145 extending from one side of ends of the poles 113 in a circumferential direction thereby to block a space between the poles 113, and coupled to the poles 113; and stator coils 121 wound on the bobbins 131. The stator is implemented as a two-phase switched reluctance motor having four segmented cores 111 coupled to one another so as to have four protruding poles 113, and stator coils 121 wound on the segmented core 111 so as to apply power having two-phase thereto.

Figure 5:
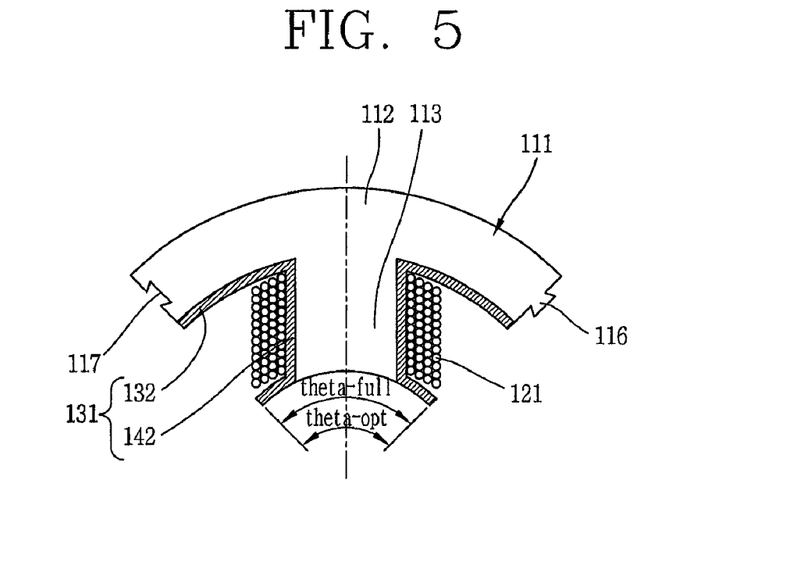
FIG. 5 is an enlargement view showing an assembled state between a bobbin and a segmented core of FIG. 4.
Figure 6:
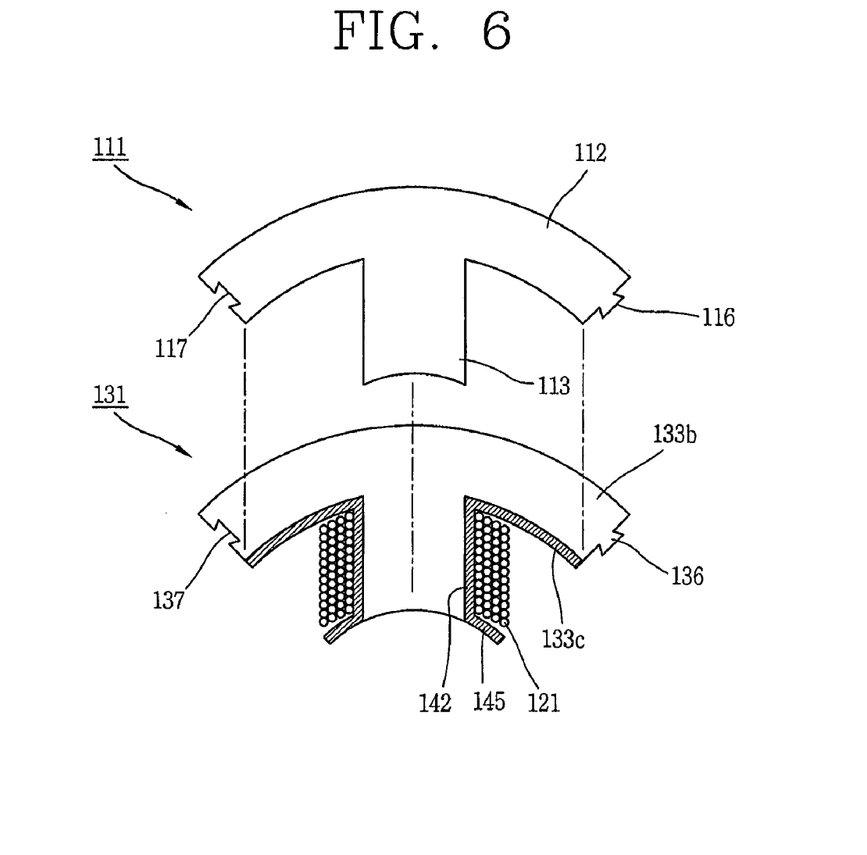
FIG. 6 is a view showing a state before the assembled state between the bobbin and the segmented core of FIG. 4.

As shown in FIGS. 5 and 6, the segmented core 111 is formed to divide a circumference by the number of the poles 113. Each pole 113 is protruding from an inner surface of each yoke 112 towards the center so as to have an arc shape. Each segmented core 111 is provided with engaging portions 115 in a circumferential direction so as to prevent the yoke 112 from being separated from the yoke receiving portion 132. The engaging portion 115 has a dovetail 116 formed on one end of the yoke 112, and a dovetail groove 117 formed on another end of the yoke 112 so as to be engaged with the dovetail 116 of another segmented core 111. Preferably, the dovetail 116 and the dovetail groove 117 are configured to be coupled to each other by a pressure more than a certain degree.

Figure 7:
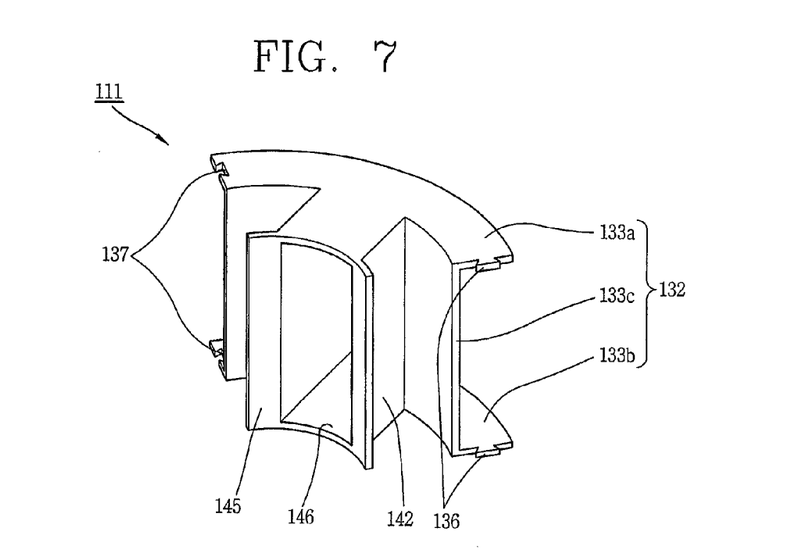
FIG. 7 is a perspective view showing the bobbin of FIG. 4.

As shown in FIG. 7, each of the bobbins 131 may include a yoke receiving portion 132 for receiving the yoke 112 of the segmented core 111, and a pole receiving portion 142 for receiving the poles 113 of the segmented core 111.

The pole receiving portion 142 is formed to surround the poles 113 so as to be insulated from the stator coils 121 wound on the poles 113. A blocking wall 145 is formed at the protruded end of the pole receiving portion 142 by being extended from ends of the poles 113 in a circumferential direction.

The blocking walls 145 are formed to have a cylindrical shape when being coupled to one another as ends thereof come in contact with each other. Accordingly, a space between the poles 113 and a space for receiving a rotor (not shown) are separated from each other. As a result, when the rotor is rotated, the BPF is prevented from being generated thereby to prevent a noise occurrence. A through hole 146 for exposing an end of the poles 113 so that the end of the poles 113 can be arranged on the same circumference as an end of the blocking wall 145 is formed at an end of the pole receiving portion 142, thereby reducing an air gap between the end of the poles 113 and the rotor and preventing a noise occurrence when the rotor is rotated.

Figure 9:
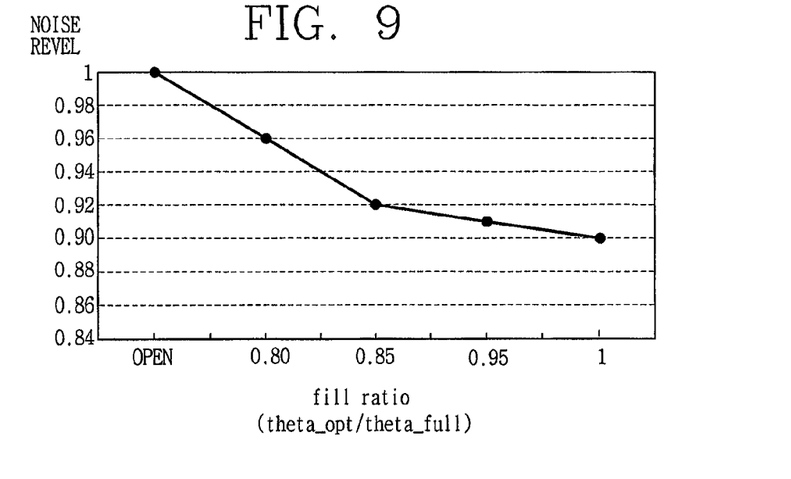
FIG. 9 is a view showing an operation of the motor having the stator of FIG. 4.

As shown in FIG. 9, in order to maintain a noise level as 0.92 or less than, the blocking wall 145 is preferably formed to have a length so that a fill ratio between a theta_opt and a theta_full (theta_opt/theta_full) can be 0.85 or more than. Here, it is assumed that a noise level when the space between the poles 113 is completely opened, that is, the bobbin 131 does not exist, is '1'. The theta_full indicates an interval between the poles 113 adjacent to each other, and the theta_opt indicates a blocked ratio of the interval by the blocking wall 145. In the present invention, a noise level of 0.90 can be obtained by the blocking walls 145 having a cylindrical shape as ends thereof come in contact with each other.

The yoke receiving portion 132 includes an upper surface portion 133a and a lower surface portion 133b respectively disposed on an upper end and a lower end of the segmented core 111, and a side surface portion 133c disposed on an inner diameter side of the yoke 112 and connecting the upper surface portion 133a and the lower surface portion 133b to each other. Accordingly, the yoke receiving portion 132 has an outwardly opened section. The upper surface portion 133a and the lower surface portion 133b of the yoke receiving portion 132 are respectively provided with an engaging portion 135 in a circumferential direction so as to prevent the yoke from being separated therefrom. The engaging portion 135 of the yoke receiving portion 132 has a dovetail 136 and a dovetail groove 137 in correspondence with a shape of the engaging portion 115 of the segmented core 111.

Once the segmented cores 111 and the bobbins 131 are formed, the stator coils 121 are wound on the pole receiving portions 142 of the bobbins 131. When the stator coils 121 are completely wound on the pole receiving portions 142, the segmented cores 111 are coupled to the bobbins by being inserted thereinto. When the coupling between the bobbins 131 and the segmented cores 111 are completed, the dovetails 116 and 136 are coupled to the dovetail grooves 117 and 137 along an axial direction, respectively.

Figure 8:
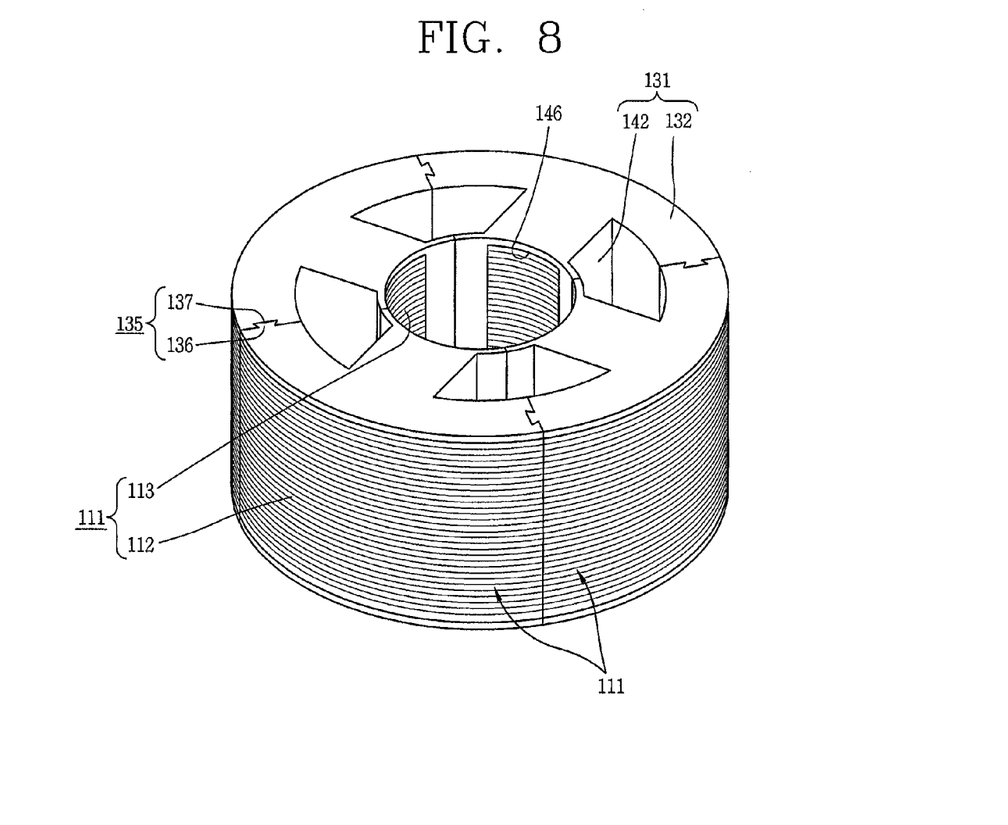
FIG. 8 is a perspective view showing an assembled state between the bobbin and the segmented core of FIG. 4.

When the segmented cores 111 are completely assembled to each other, as shown in FIG. 8, the blocking walls form a cylindrical shape as ends thereof come in contact with each other. Accordingly, an inner space for receiving a rotor is separated from a space between the poles 113, and an air flow to the two spaces is prevented by the blocking walls. As a result, a noise occurrence is reduced.

Figure 10:
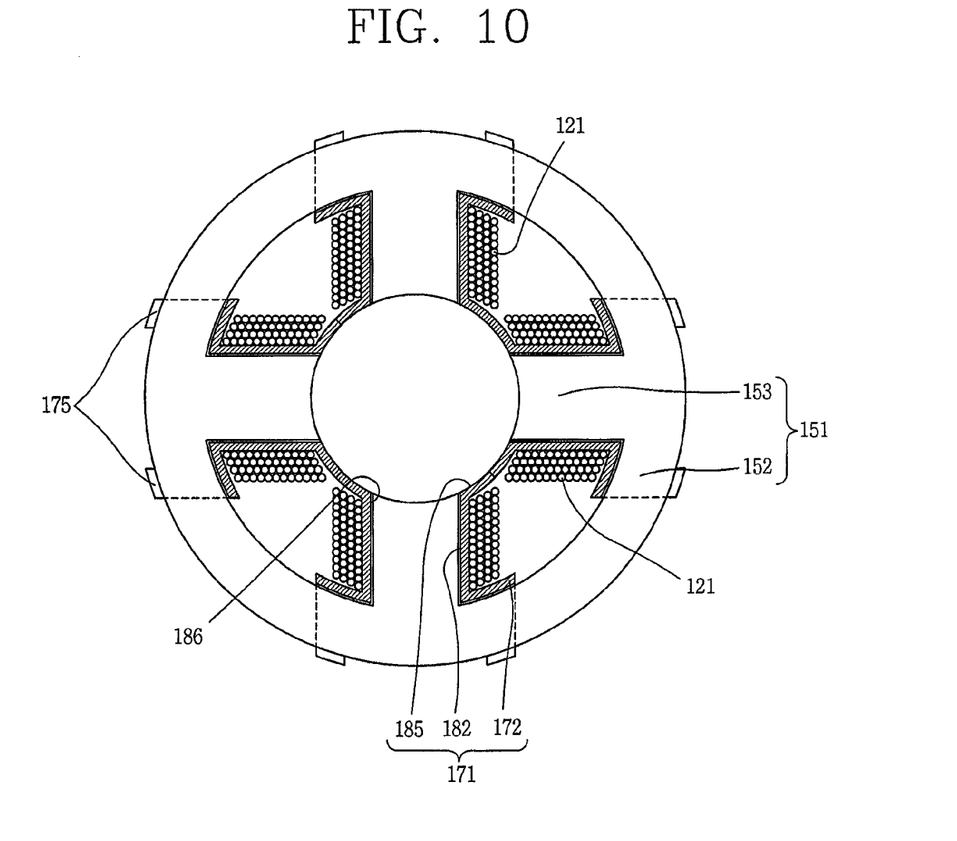
FIG. 10 is a planar section view showing a coupled state of a stator of a motor according to a second embodiment of the present invention.
Figure 11:
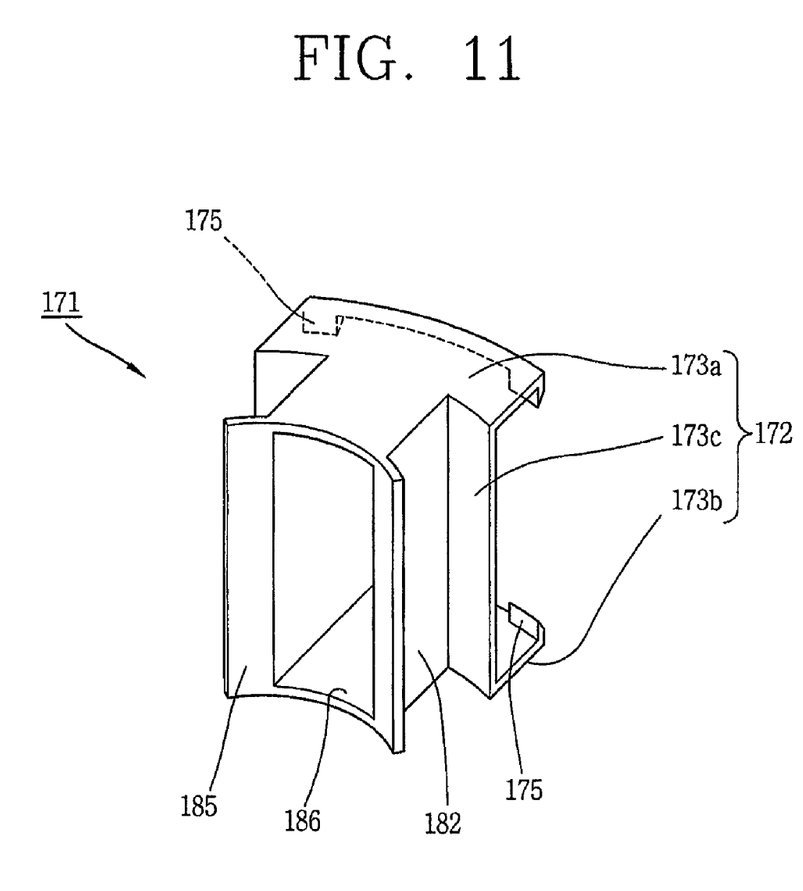
FIG. 11 is a perspective view showing a bobbin of FIG. 10.
Figure 12:
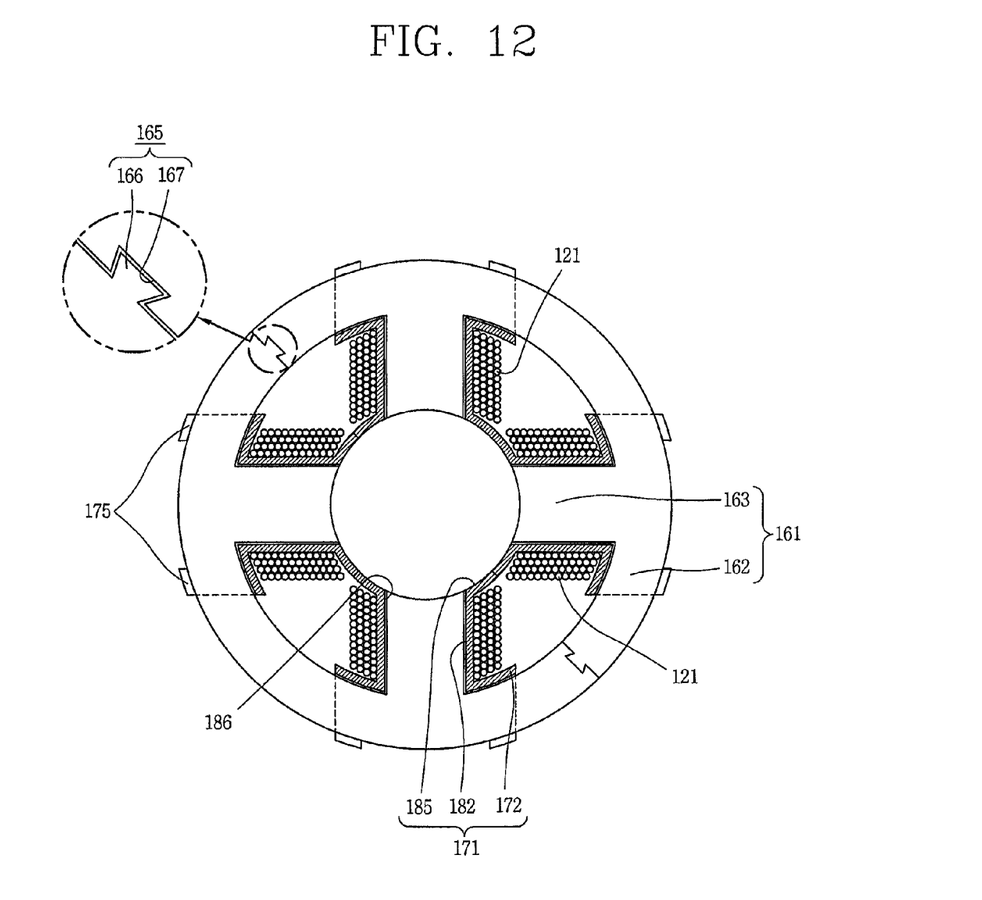
FIG. 12 is a view showing a modification example of a stator core of FIG. 10.

FIG. 10 is a planar section view showing a coupled state of a stator of a motor according to a second embodiment of the present invention, FIG. 11 is a perspective view showing bobbins of FIG. 10, and FIG. 12 is a view showing a modification example of a stator core of FIG. 10. The same reference numerals were given to the same parts as those of the aforementioned embodiment, and their detailed explanation will be omitted. The stator for an electric motor comprises a stator core 151 having one yoke 152 and a plurality of poles 153 protruding from the yoke 152 in a radial direction; and a plurality of bobbins 171 having blocking walls 185 extending from ends of the poles 153 in a circumferential direction thereby to block a space between the poles 153, and coupled to the poles 153. The stator is implemented as a two-phase switched reluctance motor having a stator core having four protruding poles 153, and stator coils 121. The stator coils 121 are wound on the poles 153 of the stator core 151 so that power having two-phase can be applied thereto.

As shown in FIG. 12, the stator may be configured to have two segmented cores 161 formed by dividing a circumference into two parts and coupled to each other. Each of the segmented cores 161 has one yoke 162 having an arc shape, and two poles 163 protruding from the yoke 162 in a radial direction. An engaging portion 165 is formed at both ends of one segmented core 161 so as to be engaged with another segmented core 161 in a circumferential direction. The engaging portion 165 may be composed of a dovetail 166 and a dovetail groove 167.

As shown in FIG. 11, each of the bobbins 171 include a yoke receiving portion 172 for receiving the yoke 152 of the stator core 151 or the yoke 162 of the segmented core 161, and a pole receiving portion 182 for receiving the pole 153 of the stator core 151 or the pole 163 of the segmented core 161.

The pole receiving portion 182 is formed to surround the pole 153 so as to be insulated from the stator coil 121 wound on the pole 153. A blocking wall 185 is formed at the protruded end of the pole receiving portion 182 by being extended from ends of the poles 113 in a circumferential direction.

The blocking walls 185 are formed to have a cylindrical shape when being coupled to one another as ends thereof come in contact with each other. Accordingly, a space between the poles 113 and a space for receiving a rotor (not shown) are separated from each other. A through hole 186 for exposing an end of the pole 153 outwardly is formed at the end of the pole receiving portion 182 so that the end of the pole 153 can be disposed on the same circumference as an end of the blocking wall 185. Accordingly, a gap between the blocking wall 185 and the poles 153 and 163 is decreased or is not generated, thereby preventing a noise occurrence due to the gap therebetween.

The yoke receiving portion 172 includes an upper surface portion 173a and a lower surface portion 173b respectively disposed on an upper end and a lower end of the stator core 151 or the segmented core 161, and a side surface portion 173c disposed on an inner diameter side of the yoke 152 and connecting the upper surface portion 173a and the lower surface portion 173b to each other. Accordingly, the yoke receiving portion 172 has an outwardly opened section.

A plurality of engaging portions 175 protruding in a thickness direction are formed at the upper surface portion 173a and the lower surface portion 173b of the yoke receiving portion 172. The engaging portions 175 are engaged with an outer circumferential surface of the stator core 151 or the segmented core 161, thereby preventing the bobbins 171 from being separated from the stator core 151 or the segmented core 161.

Once the stator coils 121 are wound on the bobbins 171, the bobbins 171 are disposed at one side of the poles 153 of the stator core 151 or the poles 163 of the segmented cores 161. Then, the bobbins 171 are pressurized towards an outer circumference of the stator core 151 or the segmented cores 161. The pole 153 or 163 is inserted into the pole receiving portion 182, and the engaging portions 175 come in contact with an upper surface of a lower surface of the stator core 151 or the segmented cores 161. As a result, the upper surface portion 173a and the lower surface portion 173b are elastically deformed so as to be widened from each other in up and down directions. When the pole 153 or 163 has been inserted into the pole receiving portion 182, the upper surface portion 173a and the lower surface portion 173b are restored to the original positions by their own elastic forces. Accordingly, the engaging portions 175 are engaged with an outer circumferential surface of the stator core 151 or the segmented cores 161, thereby preventing the bobbins 171 from being separated from the stator core 151 or the segmented cores 161.

Figure 13:
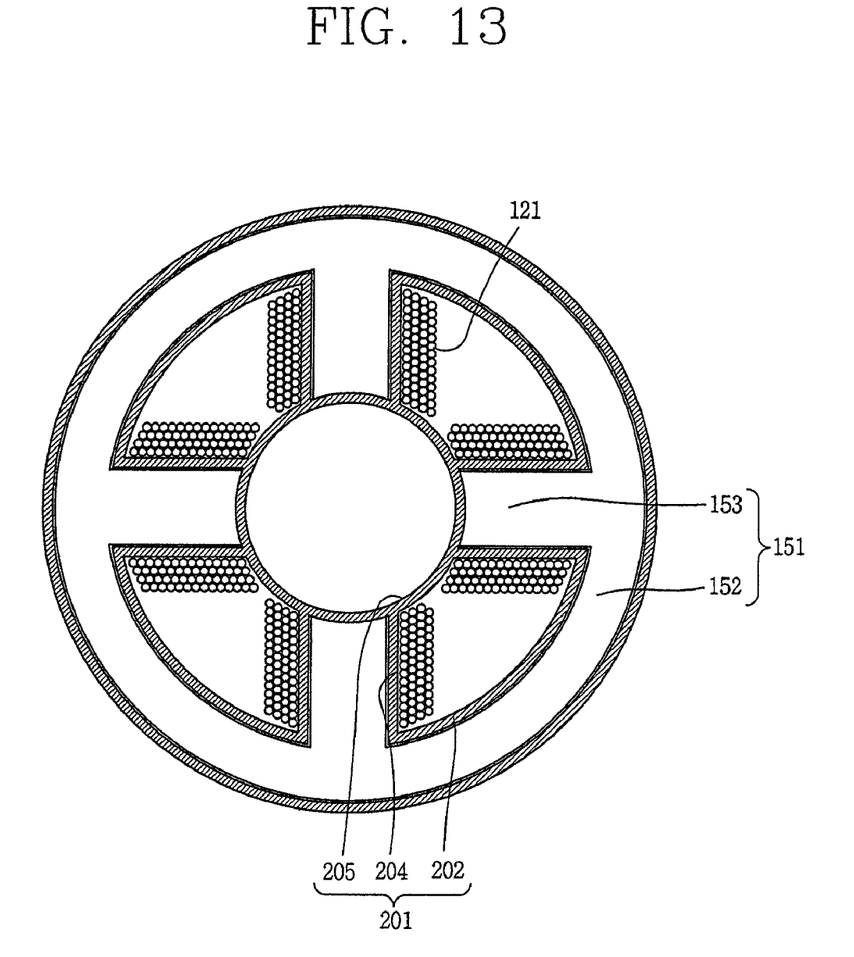
FIG. 13 is a planar section view showing a stator of a motor according to a third embodiment of the present invention.
Figure 14:
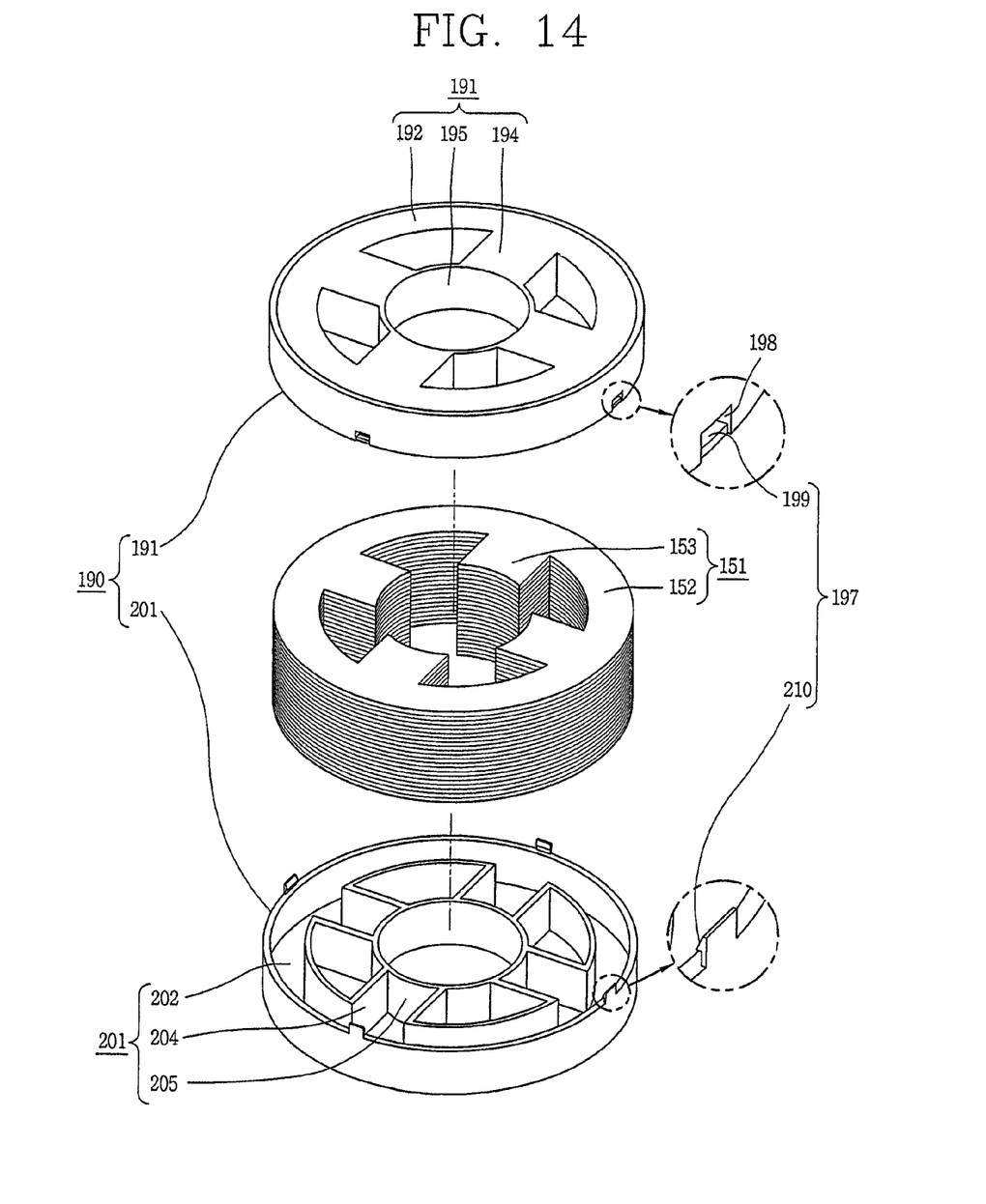
FIG. 14 is a disassembled perspective view showing a bobbin of FIG. 13.

FIG. 13 is a planar section view showing a stator of a motor according to a third embodiment of the present invention, and FIG. 14 is a disassembled perspective view showing a bobbin of FIG. 13. As shown in FIG. 14, the stator for an electric motor comprises: a stator core 151 having one yoke 152 and a plurality of poles 153 protruding from the yoke 152 in a radial direction; a plurality of bobbins 190 formed to receive the stator core 151 therein, by being coupled to each other in a thickness direction of the stator core 151, and having blocking walls 195 and 205 extending from ends of the poles 153 in a circumferential direction thereby forming a rotor receiving space therein; and stator coils 121 wound on the bobbins.

The stator core 151 includes a circular ring-shaped yoke 152, and a plurality of poles 153 radially protruding from an inner surface of the yoke 152 in a circumferential direction with the same interval.

The bobbins 190 are composed of a first bobbin 191 and a second bobbin 201 that are coupled to each other in a thickness direction of the stator core 151. The first and second bobbins 191 and 201 form a space for receiving the stator core 151 therein by being coupled to each other.

The first and second bobbins 191 and 201 respectively include yoke receiving portions 192 and 202 for receiving the yokes 152 or 162, pole receiving portions 194 and 204 for receiving the poles 153 or 163, and blocking walls 195 and 205 extending from ends of the pole receiving portions 194 and 204 and having a cylindrical shape.

Coupling portions 197 for preventing the first and second bobbins 191 and 201 from being separated from each other in a thickness direction of the stator core 151 are formed at coupling regions of the first and second bobbins 191 and 201. The coupling portions 197 are composed of a hook 210 protruding from one of the first and second bobbins 191 and 201 towards another, and a stopping jaw 199 formed at another of the first and second bobbins 191 and 201 so as to be engaged with the hook 210.

A plurality of hooks 210 are protrudingly formed at the second bobbin 201 in a thickness direction so as to be spaced from each other in a circumferential direction. The stopping jaw 199 is formed on an outer circumferential surface of the first bobbin 191 so as to be engaged with the hook 210. Here, a hook receiving portion 198 for receiving the hook 210 is concaved at a peripheral portion of the stopping jaw 199.

The first bobbin 191 and the second bobbin 201 are sequentially coupled to upper and lower ends of the stator core 151 in a thickness direction of the stator core 151. For instance, the second bobbin 201 is disposed at the bottom, and a lower end of the stator core 151 is inserted into the second bobbin 201. Then, the first bobbin 191 is disposed above the stator core 151 thus to be downwardly pressurized. Once an upper portion of the stator core 151 is inserted into the first bobbin 191 by a certain depth, the hooks 210 come in contact with the first bobbin 191 thus to be elastically deformed so as to be outwardly widened. When the upper portion of the stator core 151 has been almost inserted into the first bobbin 191, the hooks 210 are returned to the original positions by their own elastic forces. Then, the hooks 210 are engaged with the stopping jaws 199 in a thickness direction of the stator core 151. Accordingly, the first and second bobbins 191 and 201 are prevented from being separated from each other. When the coupling between the first and second bobbins 191 and 201 is completed, the stator coils 121 are wound on the pole receiving portions 194 and 204.

The stator for an electric motor and the manufacturing method thereof according to the present invention have the following effects.

The blocking wall having a cylindrical shape weakens a blade passage frequency (BPF) when the poles of the stator and the poles of the rotor come closer to each other, thereby reducing noise occurrence. Since the rotor is rotated with a high rpm corresponding to 30~80 thousands, even if noise may severely occur even by a small factor to generate noise, the noise can be reduced.

In the present invention, the blocking wall does not require a molding process performed at a space between the poles of the stator and a space between the poles of the rotor for a noise reduction. Accordingly, the conventional problem that a passage of air that flows in an axial direction of the rotor is decreased or blocked by the molding process can be solved. As a result, the temperature of the stator, the stator coil, and the rotor are prevented from rising, thereby preventing reduction of a life-span and a function lowering of components.

Furthermore, in the present invention, the stator coils are wound on the bobbins thereby facilitating a winding operation. Since the bobbins on which the stator coils have been wound are coupled to the segmented cores or the stator core, an assembly process for the bobbins is facilitated. Accordingly, an entire manufacturing process is facilitated.

The invention claimed is:

1. A stator for an electric motor, comprising:
    a plurality of segmented cores each having one yoke and at least one pole protruding with a same width and thickness from the yoke in a radial direction;
    a plurality of bobbins formed to receive the at least one pole therein, having a plurality of blocking walls that extend from one side of ends of the at least one pole in a circumferential direction thereby to block a space between the at least one pole, and coupled to the at least one pole; and
    a plurality of stator coils wound on the plurality of bobbins, wherein the plurality of blocking walls form a cylindrical shape as both sides of one of the plurality of blocking walls contact sides of adjacent plurality of blocking walls so that the space between the at least one pole and a space for receiving a rotor are separated from each other.

2. The stator of claim 1, wherein the plurality of bobbins comprise a yoke receiving portion that receives the yoke, and a pole receiving portion that receives the at least one pole.

3. The stator of claim 2, wherein the plurality of segmented cores comprise one pole, and wherein the plurality of bobbins are formed to correspond to each of the plurality of segmented cores.

4. The stator of claim 2, wherein the plurality of segmented cores comprise a plurality of poles, and wherein the plurality of bobbins comprise one pole receiving portion.

5. The stator of claim 2, wherein an engaging portion that prevents the yoke from being separated from the yoke receiving portion is formed at the yoke receiving portion of the plurality of bobbins in a circumferential direction.

6. The stator of claim 5, wherein the engaging portion of the yoke receiving portion comprises a dovetail and a dovetail groove.

7. The stator of claim 2, wherein the yoke receiving portion comprises:
    an upper surface portion and a lower surface portion respectively disposed on an upper end and a lower end of the plurality of segmented cores; and
    a side surface portion disposed on an inner diameter side of the yoke, and connecting the upper surface portion and the lower surface portion to each other.

8. The stator of claim 1, wherein a through hole that exposes an end of the at least one pole outwardly is formed at the plurality of bobbins so that the end of the at least one pole is disposed on a same circumference as an outer surface or an inner surface of the plurality of blocking walls.

9. A stator for an electric motor, comprising:
    a plurality of segmented cores, each core including a yoke and a pole that extends from the yoke in a radial direction, wherein the pole of each segmented core has a same width and a same thickness;
    a plurality of bobbins, each bobbin to receive the respective pole therein, the plurality of bobbins having a plurality of blocking walls that each extend from ends of the respective pole in a circumferential direction to block a space between the pole, and each bobbin is coupled to the respective pole; and
    a plurality of stator coils each provided on one of the bobbins, wherein the blocking walls form a cylindrical shape as a first side and a second side of one of the blocking walls contact adjacent blocking walls so that the space between the pole is separated from a space for receiving a rotor.

10. The stator of claim 9, wherein each of the bobbins comprise a yoke receiving portion to receive the respective yoke, and a pole receiving portion to receive the respective pole.

11. The stator of claim 10, wherein each of the segmented cores comprise one pole, and wherein the bobbins are formed to correspond to each of the segmented cores.

12. The stator of claim 10, wherein the segmented cores comprise a plurality of poles, and wherein the bobbins comprise a pole receiving portion.

13. The stator of claim 10, wherein an engaging portion that prevents the yoke from separating from the yoke receiving portion is formed at the yoke receiving portion of the bobbins in a circumferential direction.

14. The stator of claim 13, wherein the engaging portion of the yoke receiving portion comprises a dovetail and a dovetail groove.

15. The stator of claim 10, wherein the yoke receiving portion comprises an upper surface portion provided on an upper end of the segmented core and a lower surface portion provided on a lower end of the segmented core, and a side surface portion provided on an inner diameter side of the yoke, and the side surface portion connects the upper surface portion and the lower surface portion to each other.

16. The stator of claim 9, wherein a through hole that exposes an end of the pole outwardly is formed at the bobbins so that the end of the pole is provided on a same circumference as an outer surface of the blocking walls or an inner surface of the blocking walls.

* * * * *